United States Patent
Kaneko

(10) Patent No.: US 7,637,334 B2
(45) Date of Patent: Dec. 29, 2009

(54) FUEL CELL VEHICLE

(75) Inventor: Masaaki Kaneko, Handa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 576 days.

(21) Appl. No.: 10/566,672

(22) PCT Filed: Aug. 2, 2004

(86) PCT No.: PCT/IB2004/002455

§ 371 (c)(1), (2), (4) Date: Feb. 1, 2006

(87) PCT Pub. No.: WO2005/014328

PCT Pub. Date: Feb. 17, 2005

(65) Prior Publication Data

US 2006/0185915 A1  Aug. 24, 2006

(30) Foreign Application Priority Data

Aug. 8, 2003  (JP)  ............................. 2003-290349

(51) Int. Cl.
*B60L 11/00* (2006.01)
(52) U.S. Cl. ..................................... 180/65.31; 903/908
(58) Field of Classification Search ............... 180/65.1, 180/65.3, 65.8; 903/908
See application file for complete search history.

(56) References Cited

U.S. PATENT DOCUMENTS

| | | | | |
|---|---|---|---|---|
| 5,641,031 A * | 6/1997 | Riemer et al. | ............... | 180/65.3 |
| 5,662,184 A * | 9/1997 | Riemer et al. | ............... | 180/65.1 |
| 6,107,691 A | 8/2000 | Gore et al. | | |
| 6,220,380 B1 * | 4/2001 | Mita et al. | ............... | 180/65.1 |
| 6,378,637 B1 * | 4/2002 | Ono et al. | ............... | 180/65.3 |
| 6,648,085 B2 * | 11/2003 | Nagura et al. | ............... | 180/65.1 |
| 6,874,588 B2 * | 4/2005 | Kato et al. | ............... | 180/65.3 |
| 6,907,947 B2 * | 6/2005 | Morita et al. | ............... | 180/65.1 |
| 6,959,777 B2 * | 11/2005 | Beckerman et al. | ........ | 180/65.1 |
| 7,014,001 B2 * | 3/2006 | Beckerman et al. | ........ | 180/65.1 |
| 7,040,432 B2 * | 5/2006 | Kawasaki et al. | .......... | 180/65.1 |
| 7,195,282 B2 * | 3/2007 | Mizuno | ...................... | 280/830 |
| 7,270,202 B2 * | 9/2007 | Kondo | ........................ | 180/65.1 |
| 7,270,899 B2 * | 9/2007 | Kato et al. | ..................... | 429/12 |
| 7,363,997 B2 * | 4/2008 | Sato et al. | ................... | 180/65.3 |
| 2003/0034186 A1 | 2/2003 | Morita et al. | | |
| 2003/0046802 A1 | 3/2003 | Chernoff et al. | | |
| 2005/0139402 A1 * | 6/2005 | Yamashita | ................. | 180/65.3 |
| 2006/0102398 A1 * | 5/2006 | Mizuno | ..................... | 180/65.3 |

(Continued)

FOREIGN PATENT DOCUMENTS

DE  873 940  4/1953

(Continued)

*Primary Examiner*—Jeffrey J Restifo
(74) *Attorney, Agent, or Firm*—Kenyon & Kenyon LLP

(57) ABSTRACT

A fuel cell vehicle is equipped with a power control unit which converts power supplied from the fuel cell and supplies that converted power to a load. High voltage wiring, which connects at least one of the fuel cell and the load to the power control unit, is provided on one side of either the left or the right side of a vehicle, and a fuel line for supplying a fuel gas to the fuel cell is provided on the other side of the vehicle, which is opposite the side on which the high voltage wiring is provided.

15 Claims, 3 Drawing Sheets

U.S. PATENT DOCUMENTS

2007/0007060 A1 * 1/2007 Ono et al. .................. 180/65.3
2007/0259263 A1 * 11/2007 Shibuya et al. .............. 429/186

FOREIGN PATENT DOCUMENTS

| EP | 0 677 417 A1 | 10/1995 |
| JP | 07-304404 A | 11/1995 |
| JP | 07-315149 A | 12/1995 |
| JP | 10-164733 A | 6/1998 |
| JP | 11-127525 A | 5/1999 |
| JP | 11-127526 A | 5/1999 |
| JP | 2000-045329 A | 2/2000 |
| JP | 2001/071753 A | 3/2001 |
| JP | 2001-268720 A | 9/2001 |
| JP | 2002-151122 A | 5/2002 |
| JP | 2002-186146 A | 6/2002 |
| JP | 2002/367637 | 12/2002 |
| JP | 2003-153616 A | 5/2003 |
| WO | WO 2004/030968 A1 | 4/2004 |

* cited by examiner

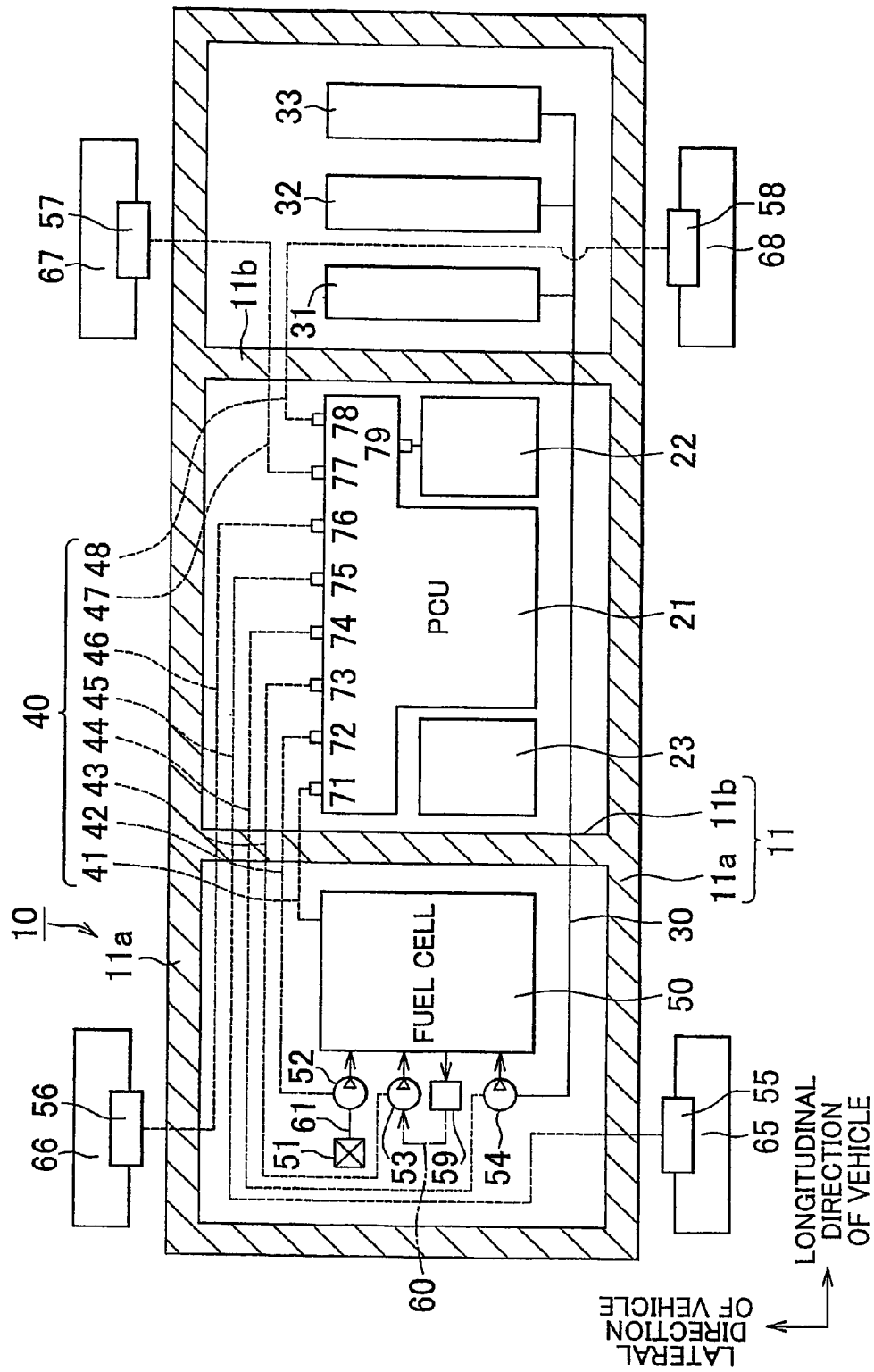

FUEL CELL VEHICLE

This is a 371 national phase application of PCT/IB2004/002455 filed 2 Aug. 2004, claiming priority to Japanese Patent Application No. JP 2003-290349 filed 8 Aug. 2003, the contents of which are incorporated herein by reference.

FIELD OF THE INVENTION

The invention relates to a fuel cell vehicle, and more particularly, to on-board layout technology of high voltage wiring and a fuel line.

BACKGROUND OF THE INVENTION

Providing a suitable layout for a fuel system (e.g., a fuel cell and high-pressure hydrogen tank, etc.) and an electrical system (e.g., a power control unit, motor, secondary battery, etc.) in a fuel cell vehicle equipped with an on-board fuel cell power generation system, which runs using power generated by a motor, is difficult with the limited space available on-board. Because hydrogen gas is flammable, the layout must be such that it does not leak near the high voltage wiring. JP(A) 2001-71753, for example, discloses technology which places the fuel system in the rear portion of the vehicle and the electrical system in the front portion of the vehicle so as to prevent a fuel line and high voltage wiring from being close to one another at the time of a vehicle collision, thereby minimizing the possibility of any leaked hydrogen gas igniting.

However, when the layout is such that the electrical system and the fuel system are separated in the longitudinal direction of the vehicle, as in JP(A) 2001-71753, the mounting space for each of the devices is extremely limited given the limited on-board space. This drastically decreases the degree of freedom in the layout.

Document US 2003/004682 A1 discloses various vehicle body business methods wherein methods and structures are described for facilitating the exchange of modular body components, such as via a removable body floor.

Further, document U.S. Pat. No. 6,107,691 discloses a method and apparatus for generating electrical power from multiple vehicles powered by fuel cells while the vehicles are parked in a parking lot, wherein a plurality of spaced-apart electrical receptacles are provided for receiving an electric cable for connection to a parked vehicle for electrically connecting the fuel cell in each of the parked vehicles to the plurality of electrical receptacles.

Another electric vehicle with a battery box arrangement is disclosed in U.S. Pat. No. 6,220,380 B1, wherein the battery box is supported below a floor panel at a central portion of the electrical vehicle.

Document EP 0 677 417 A1 discloses also an arrangement for a drive unit for an electric vehicle, wherein a fuel cell is located in the front portion of the vehicle and a reformer is located in the rear portion of the vehicle.

Further, document WO 2004/030968 A1 discloses a fuel cell equipped vehicle wherein hydrogen cylinders storing hydrogen to be supplied to a fuel cell battery, a fuel cell, fuel cell accessories, a storage battery, and a PCU that controls the supply of electric power from the fuel cell and the storage battery to a front wheels-driving electric motor and a rear wheels-driving electric motor are arranged in that order under a floor of a passenger compartment. Therefore, these major components do not reduce the spaces of a passenger compartment, a forward compartment, and a rearward compartment. Since the devices disposed under the floor of the passenger compartment have relatively great weights, the center of gravity of the vehicle comes to a low position in a central portion of the vehicle, thus achieving good running stability of the vehicle.

SUMMARY OF THE INVENTION

One object of the invention is thus to provide a fuel cell vehicle having a layout configuration in which high voltage wiring and a fuel line are arranged apart from one another, while increasing the degree of freedom in the layout of on-board devices.

A first aspect of the invention relates to a fuel cell vehicle equipped with a power control unit which converts power supplied from a fuel cell and supplies that converted power to a load. In this fuel cell vehicle, high voltage wiring, which connects at least one of the fuel cell and the load to the power control unit, is provided on one side (either the left or the right side) of a vehicle, and a fuel line for supplying a fuel gas to the fuel cell is provided on the other side of the vehicle, which is opposite the side on which the high voltage wiring is provided.

Accordingly, the degree of safety during a vehicle collision can be increased because the high voltage wiring and the fuel line are not immediately next to one another. Further, the degree of freedom in the layout of the devices can be increased because there is no need to arrange the fuel system and the electrical system so that they are spaced apart from one another in the longitudinal direction of the vehicle.

The power control unit preferably includes a connector for connecting the high voltage wiring to the power control unit. This connector is preferably arranged in the longitudinal direction of the vehicle facing the one side. This configuration makes it easy to provide the high voltage wiring on one side of the vehicle.

Also, the power control unit is preferably enclosed in a case, which is preferably generally L-shaped or T-shaped. This makes it possible to ensure sufficient space for arranging the connectors connected to the high voltage wiring in the longitudinal direction of the vehicle so that they all face one side of the vehicle.

Further, the fuel cell vehicle may also include a first frame and a second frame, both of which extend in the longitudinal direction of the vehicle. The high voltage wiring may be provided along the first frame and the fuel line may be provided along the second frame. Also, the high voltage wiring and the fuel line may be routed between the first frame and the second frame. Accordingly, damage to the high voltage wiring and the fuel line due to an impact from the side of the vehicle is able to be avoided.

Moreover, the fuel cell vehicle may also include a third frame provided at a front portion of the vehicle that extends in the lateral direction of the vehicle, and a fourth frame provided at a rear portion of the vehicle that extends in the lateral direction of the vehicle. In this case, the high voltage wiring and the fuel line may be provided between the third frame and the fourth frame. Accordingly, damage to the high voltage wiring and the fuel line due to an impact from the front or back of the vehicle is able to be avoided. Further, the fuel supply source, the fuel cell, the load, and the power control unit may be arranged surrounded by the first frame, the second frame, the third frame, and the fourth frame. This structure prevents an impact on the vehicle from being transmitted to the fuel supply source, the fuel cell, the load, and the power control unit. As a result, damage to the high voltage wiring and the fuel line is able to be avoided.

A second aspect of the invention relates to a fuel cell vehicle equipped with a power control unit which converts power supplied from a fuel cell and supplies that converted power to a load. In this fuel cell vehicle, the fuel cell, the power control unit, and a fuel supply source that supplies fuel gas to the fuel cell are provided under a floor of a vehicle cabin. Also, a fuel line that connects the fuel cell to the fuel supply source and electrical wiring that connects the fuel cell to the power control unit are provided spaced apart from one another in the lateral direction of the vehicle.

By providing the fuel line and the electrical wiring spaced apart from one another in the lateral direction of the vehicle, it is possible to avoid them being close to one another without sacrificing the degree of freedom in the layout of the various devices such as the fuel supply source, the fuel cell and the power control unit.

According to the foregoing first and second aspects of the invention, the degree of safety during a vehicle collision can be increased because the high voltage wiring and the fuel line are not immediately next to one another. Further, the degree of freedom in the layout of the devices can be increased because there is no need to arrange the fuel system and the electrical system separated from one another in the longitudinal direction of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a view of the layout of various on-board devices according to a second exemplary embodiment.

DETAILED DESCRIPTION OF THE PREFERRED EMBODIMENTS

Figure 1:
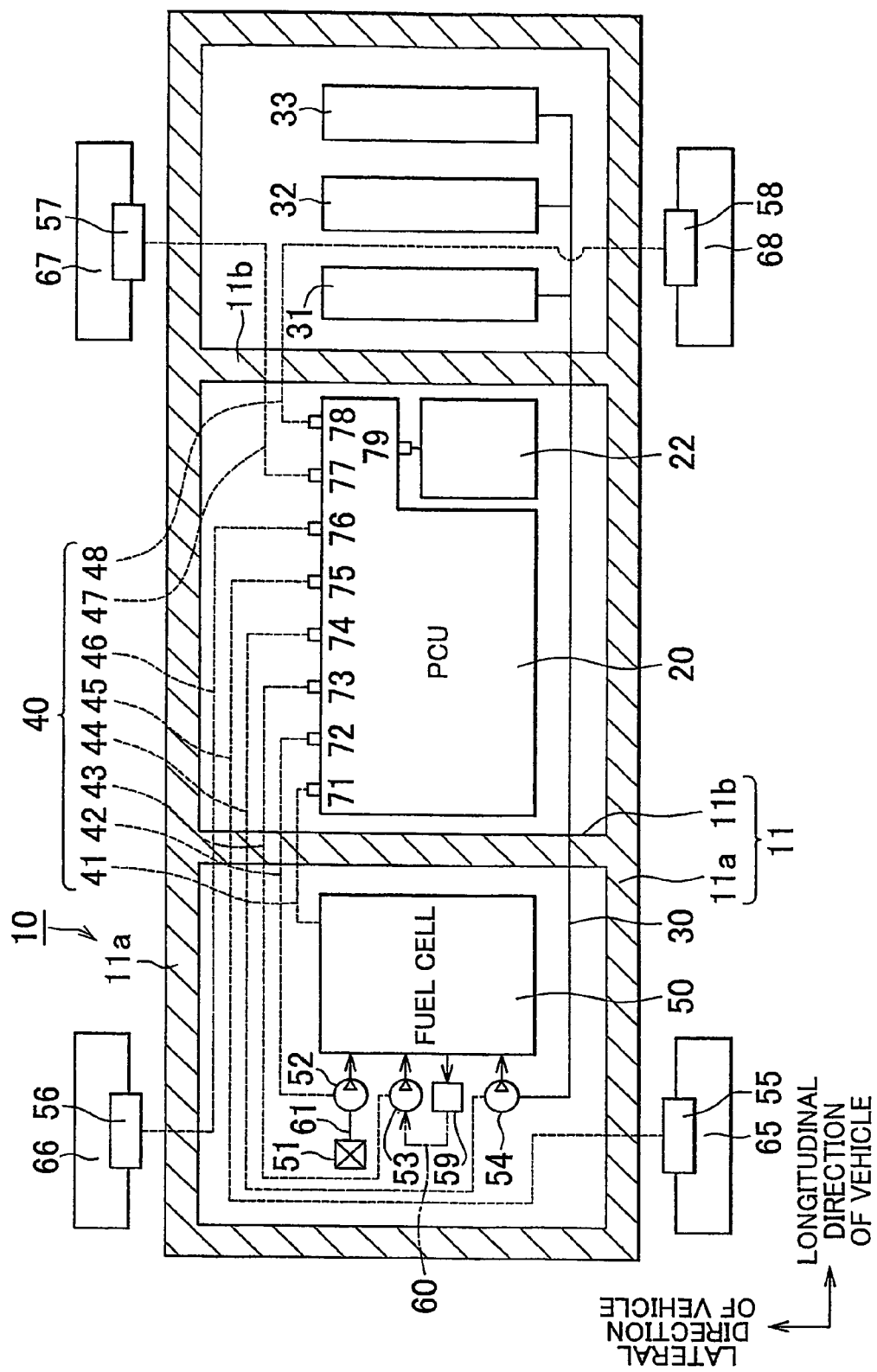
FIG. 1 is a view of the layout of various on-board devices according to a first exemplary embodiment.

Hereinafter, a first preferred embodiment will be described with reference to the accompanying drawings. FIG. 1 shows the layout of various on-board devices mounted in a fuel cell vehicle. Mounted to a vehicle frame 11 that comprises the skeleton of a fuel cell vehicle 10 are primarily a fuel cell 50, high-pressure hydrogen tanks (hydrogen storage containers) 31 to 33, in-wheel motors (three-phase motors) 55 to 58, and a power control unit (hereinafter, simply referred to as "PCU") 20. The fuel cell 50 generates power with fuel gas (hydrogen-rich fuel gas) and oxidizing gas supplied to it. The high-pressure hydrogen tanks 31 to 33 supply the hydrogen-rich fuel gas to the fuel cell 50. The in-wheel motors 55 to 58 are incorporated into the wheels of tire/wheel assemblies 65 to 68. The PCU 20 converts direct-current (DC) power output from the fuel cell 50 into alternating-current (AC) power and supplies it to the in-wheel motors 55 to 58 and other loads (i.e., auxiliaries such as an air compressor pump 52, to be described later). The PCU 20 also reduces the high voltage output from the fuel cell 50 to a low voltage for operating the auxiliaries and charges a secondary battery (power storing means) 22.

Auxiliaries of the fuel cell 50 which are mounted in the front portion of the vehicle include the air compressor pump 52, a hydrogen pump 54, a water pump 53, and a heat exchanging device 59. The air compressor pump 52 compresses air introduced through an air line 61 via an air cleaner 51 provided in the front portion of the vehicle to a high pressure and supplies it to an oxygen pole of the fuel cell 50. The hydrogen pump 54 controls the amount of fuel gas supplied from the high-pressure hydrogen tanks 31 to 33 to a hydrogen pole of the fuel cell 50 via a fuel line (hydrogen line) 30 laid along the left side of the vehicle in the longitudinal direction thereof. The water pump 53 circulates coolant(water) through the coolant line 60 into the fuel cell 50. The heat exchanging device 59 cools the heated coolant.

The DC power output from the fuel cell 50 is supplied to an input connector 71 of the PCU 20 via a high voltage wire (electric wire) 41 and converted to AC power. This AC power is then supplied to the air compressor pump 52, the water pump 53, the hydrogen pump 54, and the in-wheel motors 55 to 58 via high voltage wires (electric wires) 42 to 48 which are connected to output connectors 72 to 78, respectively. Further, the PCU 20 is configured to reduce the voltage of the DC power supplied from the fuel cell 50 and charge the secondary battery 22 via an output connector 79. The PCU 20 can also charge the secondary battery 22 using regenerated energy when the vehicle is braked.

The vehicle frame 11 includes two side members 11a, one arranged along each side of the vehicle, and two cross members 11b which connect the side members 11a. The fuel cell 50, the PCU 20, the secondary battery 22, and the high-pressure hydrogen tanks 31 to 33 are arranged in that sequence from the front of the vehicle below the floor of the vehicle cabin. Further, the PCU 20 and the secondary battery 22 are both arranged between the two cross members 11b so that they are protected by an extremely rigid frame construction.

The connector arrangement of the PCU 20 is preferably such that all of the connectors 71 to 78 connected to the high voltage wiring face either the right side or the left side (i.e., the side opposite the side on which the fuel line 30 is laid) of the vehicle. Arranging the connectors in this fashion enables the high voltage wiring (i.e., electrical wiring system) 40 consisting of the high voltage wires 41 to 48 to be routed on the side of the vehicle opposite the side on which the fuel line 30 is laid, and therefore apart from the fuel line 30, in the longitudinal direction of the vehicle. In order to achieve this connector arrangement, the shape of the case of the PCU 20 is preferably made to resemble the letter "L", with the connectors 71 to 78 arranged along the bottom edge of the "L" and the letter being oriented such that a virtual line through its center is in the lateral direction of the vehicle. Making the case of the PCU 20 in an "L" shape makes it possible to ensure sufficient space for all of the connectors 71 to 78 to extend in the longitudinal direction of the vehicle facing one side of the vehicle. The example in the FIG. 1 shows a layout in which the high voltage wiring 40 and the fuel line 30 are as far apart from one another as possible in the lateral direction of the vehicle, with the high voltage power wiring 40 being routed in the longitudinal direction of the vehicle along the right side of the vehicle, and the fuel line 30 extending in the longitudinal direction of the vehicle along the left side of the vehicle.

Making the PCU 20 generally L-shaped ensures sufficient space for mounting the secondary battery 22 in the inside corner of the "L", thus making efficient use of mounting space in the vehicle. The phraseology "generally L-shaped" in this specification includes a regular "L" shape and a left-right reversed "L" shape. It also includes an inverted "L" shape and an inverted left-right reversed "L" shape as long as the bottom of the "L" on which the connectors are provided is on the opposite side of the vehicle from the fuel line 30.

Figure 2:
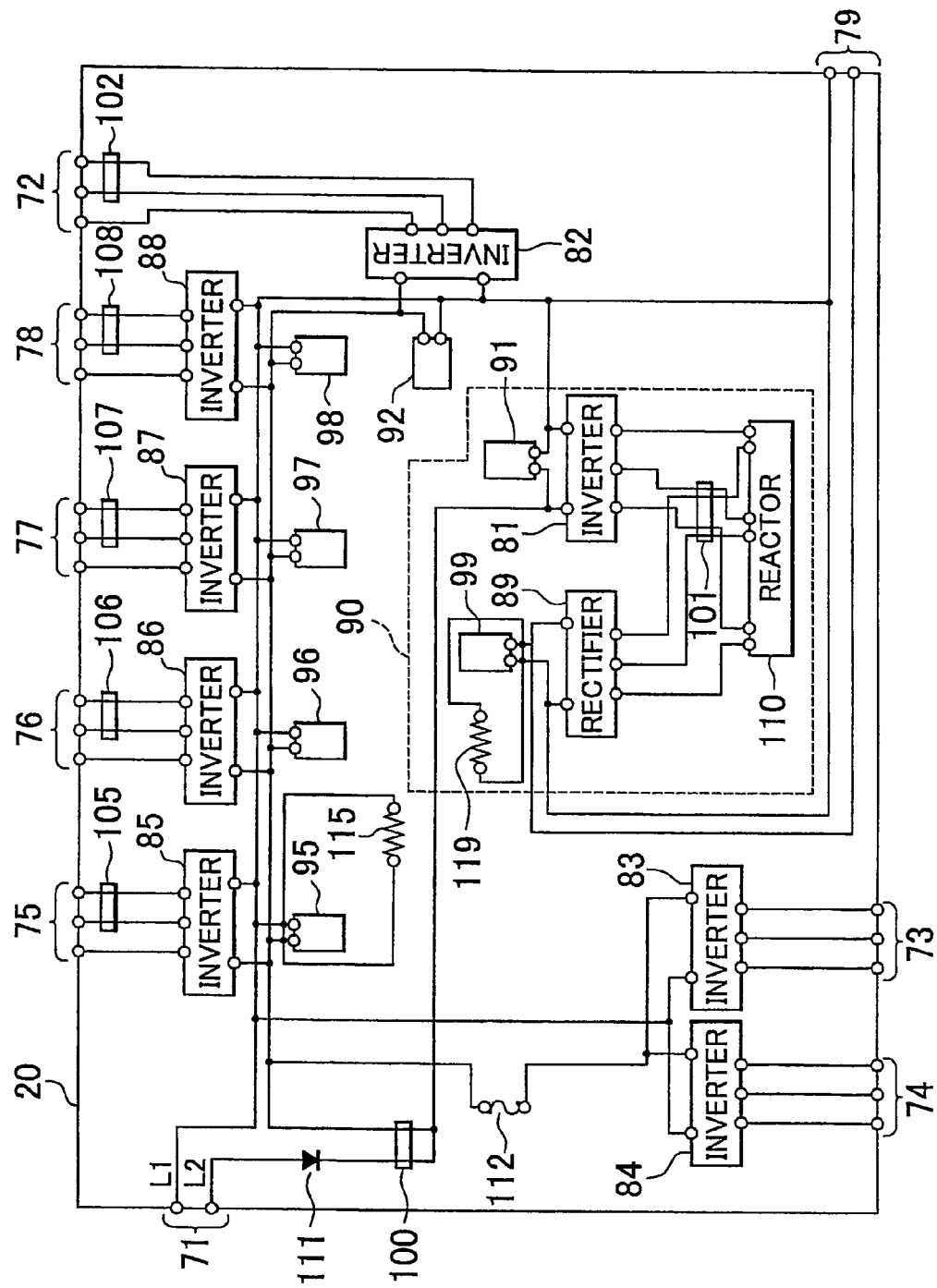
FIG. 2 is a circuit block diagram of a power control unit.

FIG. 2 is a circuit block diagram of the PCU 20. A pair of power lines L1 and L2 are connected via a rectifier diode 111 to the input connector 71 which receives the power output from the fuel cell 50. Inverters 82 to 88 and a DC/DC converter 90 are connected in parallel to the power lines L1 and L2. The inverters 82 to 88 convert the DC power to AC power (three-phase alternating current) and supply it to the in-wheel motors 55 to 58 and the various auxiliaries (such as the air compressor pump 52). Output terminals of the inverters 82 to 88 are connected to the output connectors 72 to 78. The DC/DC converter 90 reduces the voltage of the DC power and charges the secondary battery 22. The DC/DC converter 90 is a down-converter which includes an inverter 81, a reactor 110, and a rectifier 89. The output terminal of the DC/DC converter 90 is connected to the output connector 79.

In FIG. 2 are shown smoothing condensers 91 and 92 and 95 to 99, current sensors 100 to 102 and 105 to 108, a fuse 112, and discharging resisters 115 and 119. The auxiliaries such as the tire/wheel assemblies 65 to 68 and the air compressor pump 52 are able to be controlled in response to the operating state of the vehicle by detecting the angular position of a motor rotor of, for example, the in-wheel motors 55 to 58 from the sensor signals from the current sensors 102 and 105 to 108.

As described above, according to the exemplary embodiment, the case of the PCU 20 has a general "L" shape so that all of the connectors 71 to 78 connected to the high voltage wiring 40 are arranged in one direction (the longitudinal direction of the vehicle). As a result, the high voltage wiring 40 can be routed on the opposite side of the vehicle from the fuel line 30 such that a layout can be achieved in which the high voltage wiring 40 and the fuel line 30 are spaced apart from one another in the lateral direction of the vehicle. This obviates the need to mount the fuel system and the electrical system apart from one another in the longitudinal direction of the vehicle, thereby increasing the degree of freedom in the mounting layout.

Next, a second preferred embodiment of the invention will be described. FIG. 3 shows the layout of various on-board devices mounted in a fuel cell vehicle. Parts shown in FIG. 3 that are denoted by the same reference numerals as parts shown in FIG. 1 are the same as those parts shown in FIG. 1, so detailed descriptions will be omitted. In this exemplary embodiment, the shape of the case of a power control unit (hereinafter, referred to simply as "PCU") 21 is made to resemble the letter "T", with the connectors 71 to 78 arranged along the top edge of the "T" and the letter being oriented such that a virtual line through its center is in the lateral direction of the vehicle. Accordingly, all of the connectors 71 to 78 in this case are arranged in the longitudinal direction of the vehicle so that they face the side of the vehicle opposite the side with the fuel line 30. Making the case of the PCU 21 generally T-shaped in this way makes it possible not only to ensure sufficient space for arranging all of the connectors 71 to 78, but also to provide two locations for mounting on-board devices because the "T" has two inside corners. In one of these spaces can be mounted the secondary battery 22 and in the other can be mounted a variety of auxiliaries 23 such as a radiator and water pump or the like for cooling the PCU 21.

The structures in the examples described above are such that fuel gas stored in the high-pressure hydrogen tanks 31 to 33 is supplied to the fuel cell 50 through the fuel line 30. The invention is not limited to this, however. For example, the structure may be such that a raw fuel such as methane, ethane, propane, butane, methanol, ethanol, dimethyl ether, acetone, gasoline, or light fuel oil is reformed to a hydrogen-rich gas in the vehicle and then supplied to the fuel cell 50 through the fuel line 30. Alternatively, the structures may be such that hydrogen stored in a hydrogen-absorbing alloy tank is supplied to the fuel cell 50 through the fuel line 30.

The invention claimed is:

1. A fuel cell vehicle comprising:
   a fuel cell;
   a power storing device;
   a fuel supply source;
   a load;
   a power control unit which converts power supplied from the fuel cell and supplies that converted power to the load;
   high voltage wiring, which connects at least one of the fuel cell and the load to the power control unit, the high voltage wiring being provided in a longitudinal direction of a vehicle along an inner side of a first side member of the vehicle on a first side of the vehicle, which is a left or a right side of the vehicle; and
   a fuel line for supplying a fuel gas to the fuel cell from the fuel gas supply source, the fuel line being provided in the longitudinal direction of the vehicle along an inner side of a second side member of the vehicle, which is provided opposite to the first side member and which is opposite to the first side on which the high voltage wiring is provided, in manner such that the high voltage wiring and the fuel line are spaced apart from one another in a lateral direction of the vehicle,
   wherein the fuel cell, the power storing device and the fuel supply source are arranged, in that sequence, from the front of the vehicle.

2. The fuel cell vehicle according to claim 1, wherein the power control unit includes a connector for connecting the high voltage wiring to the power control unit, and the connector is arranged in the longitudinal direction of the vehicle facing the one side.

3. The fuel cell vehicle according to claim 2, wherein the vehicle includes a fuel supply source which supplies the fuel gas to the fuel cell, and the connector of the power control unit is positioned on the opposite side of the vehicle, in the lateral direction of the vehicle, from the location where the fuel supply source and the fuel line are connected.

4. The fuel cell vehicle according to claim 3, wherein the fuel supply source includes a vessel in which the fuel gas is stored.

5. The fuel cell vehicle according to claim 4, wherein the vessel is a hydrogen gas tank.

6. The fuel cell vehicle according to claim 1, wherein the power control unit is enclosed in a case, and the case is generally L-shaped or T-shaped.

7. The fuel cell vehicle according to claim 1, further comprising:
   a first frame and a second frame, both of which extend in the longitudinal direction of the vehicle, and wherein the high voltage wiring is provided along the first frame and the fuel line is provided along the second frame.

8. The fuel cell vehicle according to claim 7, wherein the high voltage wiring and the fuel line are provided between the first frame and the second frame.

9. The fuel cell vehicle according to claim 7, further comprising:
   a third frame provided at a front portion of the vehicle that extends in the lateral direction of the vehicle;
   a fourth frame provided at a rear portion of the vehicle that extends in the lateral direction of the vehicle, and wherein
   the high voltage wiring and the fuel line are provided between the third frame and the fourth frame.

10. The fuel cell vehicle according to claim 9, wherein the fuel supply source, the fuel cell, the load, and the power control unit are arranged surrounded by the first frame, the second frame, the third frame, and the fourth frame.

11. A fuel cell vehicle comprising:
a fuel cell provided under a floor of a vehicle cabin;
a power storing device provided under the floor of the vehicle cabin;
a power control unit provided under the floor of the vehicle cabin, which converts power supplied from the fuel cell and supplies that converted power to a load;
a fuel supply source provided under the floor of the vehicle cabin, which supplies a fuel gas to the fuel cell;
a fuel line which connects the fuel cell with the fuel supply source; and
electrical wiring which is provided spaced apart, in the lateral direction of the vehicle, from the fuel line, and which connects the fuel cell with the power control unit,
wherein the high voltage wiring extends on one side of either left or right side of the vehicle in a longitudinal direction of the vehicle, wherein the fuel line extends on the other side of the vehicle in the longitudinal direction, and
wherein the fuel cell, the power storing device and the fuel supply source are arranged in a row, in that sequence, in the longitudinal direction of the vehicle.

12. The fuel cell vehicle according to claim 11, wherein the fuel cell, the power control unit, and the fuel supply source are arranged in that sequence from the front of the vehicle.

13. The fuel cell vehicle according to claim 12, wherein the fuel cell, the power control unit, the power storing device, and the fuel supply source are arranged in that sequence from the front of the vehicle.

14. The fuel cell vehicle according to claim 13, wherein the fuel supply source includes a vessel in which the fuel gas is stored.

15. The fuel cell vehicle according to claim 14, wherein the vessel is a hydrogen vessel in which hydrogen is stored.

* * * * *

UNITED STATES PATENT AND TRADEMARK OFFICE
CERTIFICATE OF CORRECTION

PATENT NO.        : 7,637,334 B2                                                      Page 1 of 1
APPLICATION NO. : 10/566672
DATED             : December 29, 2009
INVENTOR(S)       : Masaaki Kaneko It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Ninth Day of November, 2010

David J. Kappos
*Director of the United States Patent and Trademark Office*